(12) United States Patent
Bonamy et al.

(10) Patent No.: US 12,437,657 B2
(45) Date of Patent: Oct. 7, 2025

(54) FLIGHT MANAGEMENT SYSTEM FOR AN AIRCRAFT

(71) Applicant: THALES, Meudon (FR)

(72) Inventors: Frédéric Bonamy, Toulouse (FR); Baptiste Idiart, Toulouse (FR); Baptiste Lefevre, Toulouse (FR); François Michel, Toulouse (FR); Olivier Soussiel, Toulouse (FR)

(73) Assignee: THALES, Meudon (FR)

( * ) Notice: Subject to any disclaimer, the term of this patent is extended or adjusted under 35 U.S.C. 154(b) by 112 days.

(21) Appl. No.: 18/605,710

(22) Filed: Mar. 14, 2024

(65) Prior Publication Data

US 2024/0321118 A1    Sep. 26, 2024

(30) Foreign Application Priority Data

Mar. 20, 2023    (FR) .................................. 2302537

(51) Int. Cl.
 *G08G 5/34*    (2025.01)
 *G08G 5/21*    (2025.01)
 *G08G 5/26*    (2025.01)
 *G08G 5/80*    (2025.01)

(52) U.S. Cl.
 CPC ............... *G08G 5/34* (2025.01); *G08G 5/21* (2025.01); *G08G 5/26* (2025.01); *G08G 5/80* (2025.01)

(58) Field of Classification Search
 CPC .. G08G 5/34; G08G 5/21; G08G 5/26; G08G 5/80; G08G 5/53; G08G 5/55; G05D 2105/22; G05D 2107/13; G05D 2109/20; G05D 1/646; G05D 1/80; G05D 2103/00
 See application file for complete search history.

(56) References Cited

U.S. PATENT DOCUMENTS

| | | | |
|---|---|---|---|
| 8,463,464 B2 | 6/2013 | Gustafsson | |
| 9,530,321 B2 | 12/2016 | Deker et al. | |
| 10,295,349 B2 | 5/2019 | Mere | |
| 2016/0240091 A1 | 8/2016 | Thiele et al. | |
| 2017/0032683 A1* | 2/2017 | Meserole, Jr. | G08G 5/80 |
| 2018/0075762 A1* | 3/2018 | Gadgil | G08G 5/55 |
| 2018/0218621 A1* | 8/2018 | Canale | G05D 1/102 |
| 2021/0319705 A1* | 10/2021 | Furumoto | G08G 5/58 |

* cited by examiner

Primary Examiner — Behrang Badii
(74) Attorney, Agent, or Firm — BakerHostetler

(57) ABSTRACT

A flight management system for an aircraft, includes a critical first avionics module for trajectory calculation, i.e. a module the integrity level and availability level of which are specified by regulatory standards in force, delivering as output a safe trajectory, based on a flight plan; a second module for trajectory calculation that is less critical than the critical first module, i.e. a module the integrity level and availability level of which are lower than those of the first module, delivering as output an improved trajectory that is less safe than the trajectory delivered by the critical first avionics module, based on a flight plan; a critical avionics module for trajectory verification, configured to validate or invalidate the safety of the less safe improved trajectory; and a critical avionics module for decision-making configured to select a trajectory from the safe trajectory and the less safe trajectory.

7 Claims, 1 Drawing Sheet

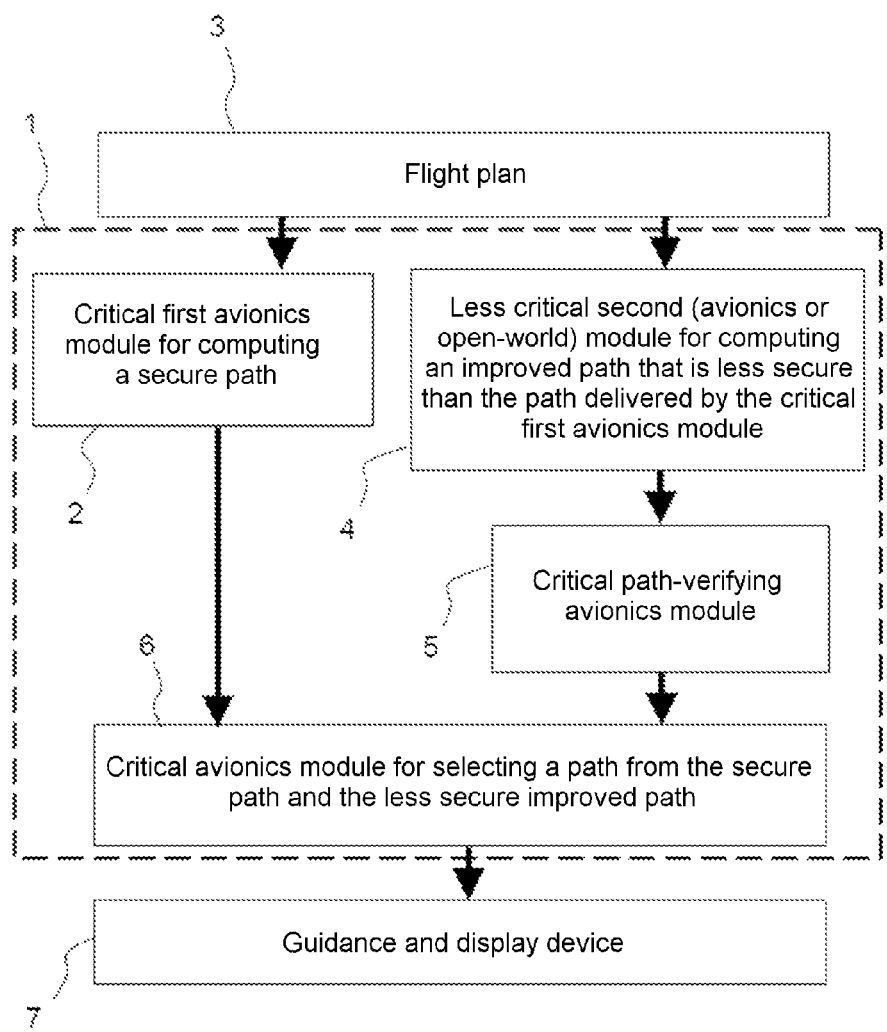

FLIGHT MANAGEMENT SYSTEM FOR AN AIRCRAFT

CROSS-REFERENCE TO RELATED APPLICATION

This application claims priority to foreign French patent application No. FR 2302537, filed on Mar. 20, 2023, the disclosure of which is incorporated by reference in its entirety.

FIELD OF THE INVENTION

The present invention relates to a flight management system for an aircraft.

The invention relates to the field of embedded systems, and more particularly to optimization of the trajectory of an aircraft.

BACKGROUND

In the context of the present invention, avionics systems are safe embedded systems meeting regulatory constraints in respect of integrity and availability. These avionics systems are characterized by a criticality level, which is related to the integrity level and availability level required by the regulatory standards in force.

By integrity what is meant is the ability of a system to accomplish a required function correctly. By availability what is meant is the ability of a system to accomplish a required function under given conditions, at a given time or during a given time interval. By "non-avionic" system or "open-world" system, what is meant is a system that is not embedded and/or that does not meet the same regulatory constraints in respect of integrity and availability.

Criticality levels are for example defined in the standards RTCA DO178-C and EUROCAE ED-12C by five criticality levels (from A to E) defined as follows:
  Level A: a fault in the system or subsystem in question may cause a catastrophic problem—flight safety or landing compromised—crash of the aircraft.
  Level B: a fault in the system or subsystem in question may cause a dangerous problem leading to serious damage or even to death of a few occupants.
  Level C: a fault in the system or subsystem in question may cause a major problem leading to malfunction of vital equipment of the aircraft.
  Level D: a fault in the system or subsystem in question may cause a minor problem having no effect on flight safety.
  Level E: a fault in the system or subsystem in question may cause a problem having no effect on flight safety.

These 5 levels are also called DAL levels (DAL standing for Design Assurance Level). The levels are established via studies of operational safety. These studies then set hardware and software DAL levels in accordance with safety standards (Eurocae ED-79 and SAE ARP 4754 "Certification Considerations for Highly-Integrated and Complex Aircraft Systems") or guidelines of the aircraft manufacturer (ABD100, ABD200, etc.). The DAL level of a subsystem may be different from the system level provided that the DAL level of the system is achieved via an appropriate hardware/software architecture.

The invention is applicable to the field of air transport, irrespectively of whether it is a question of commercial aviation, business aviation, aerial work, remotely controlled aircraft or autonomous aircraft.

Currently, in an embedded flight management system or FMS of an aircraft, one of the most complex functions is calculation of trajectory and predictions (fuel, performance, arrival time) based on the flight plan of the aircraft. This function is complex because it manages optimization of the flight and of multiple constraints. The associated processing operations require a specific real-time architecture and the processor or CPU (CPU standing for Central Processing Unit) to have a large computing capacity.

Currently, the trajectory-calculation and prediction-making function is implemented entirely on certified avionics systems. The following are the steps of calculation of this function:
  generation of the flight plan,
  trajectory calculation, and
  guidance along the trajectory.

There are many patents relating to flight management systems, some of which address a link between the critical-avionics domain and less critical domains (i.e., less critical avionics or non-avionics, the latter also being referred to as open world).

Document U.S. Pat. No. 10,295,349 B2, which relates to an aircraft flight management system that makes safe data delivered by the non-avionics or open-world domain, is for example known. This document describes an architecture with two flight management systems, one of which validates non-critical open-world data, while the other of which continues to conduct the flight. This system requires two flight management systems to operate in parallel, this being resource intensive and financially expensive.

The conventional approach consisting in optimizing trajectory in critical certified avionics has an increasingly high cost, which is not economically viable.

Furthermore, none of the proposed methods for connecting the flight management system to the open world allow trajectory and predictions to be calculated in less critical systems (i.e. in an avionics system less critical than a conventional FMS or in an open-world system), this limiting the performance of the optimization algorithms used.

SUMMARY OF THE INVENTION

One aim of the invention is to address the aforementioned problems, and in particular to increase the accuracy of the calculations carried out to optimize the flight of an aircraft, in a field where operational performance requirements demand increasingly complex algorithms based on an increasing amount of data, and to do so while keeping down development costs, which are high when it is a question of producing certified embedded systems.

According to one aspect of the invention a flight management system for an aircraft is provided, this flight management system comprising:
  a critical first avionics module for trajectory calculation, i.e. a module the integrity level and availability level of which are specified by regulatory standards in force, comprising at least one critical avionics computer and/or at least one critical avionics software package for calculating and delivering as output a safe trajectory, based on a flight plan;
  a second module for trajectory calculation that is less critical than the critical first module, i.e. a module the integrity level and availability level of which are lower than those of the first module, comprising at least one computer that is less critical than a computer of the first module, and/or at least one software package that is less critical than a software package of the first module, and that have/has a higher performance than the avionics computers and software packages of the critical first avionics module for trajectory calculation, to calculate and deliver as output an improved trajectory that is less safe than the trajectory delivered by the critical first avionics module, based on a flight plan;

a critical avionics module for trajectory verification configured to validate or invalidate the safety of the improved trajectory delivered by the second module for trajectory calculation; and a critical avionics module for decision-making configured to select a trajectory from the safe trajectory delivered by the critical first avionics module and the less safe trajectory delivered by the second module, so as to select the less safe improved trajectory if its safety is validated by the critical verification avionics module, to select the safe trajectory if the safety of the less safe improved trajectory is invalidated by the critical verification avionics module, and to deliver as output the selected trajectory;

the critical avionics module for trajectory verification being configured to validate or invalidate the safety of the less safe improved trajectory based on verifications:

of compliance with the flight plan of the aircraft by the less safe improved trajectory; and/or of the continuity of the less safe improved trajectory; and/or of compliance of the performance of the aircraft with the less safe improved trajectory; and/or of avoidance of obstacles by the less safe improved trajectory; and/or of a proximity of the start of the less safe improved trajectory to the current position of the aircraft.

Thus, what is meant by second module for trajectory calculation that is less critical than the critical first avionics module, with reference to the critical first avionics module, is an avionics module that is less critical than the critical first module or a non-avionics or open-world module.

In one embodiment, the critical avionics module for decision-making is configured to transmit the selected trajectory to a guidance and display device.

According to one embodiment, the second module for trajectory calculation comprises at least one remote connected computer, for example one integrated into a ground-based server.

In one embodiment, the second module for trajectory calculation comprises at least one software package employing artificial intelligence.

In one embodiment, the critical avionics module for trajectory verification is configured to verify the proximity of the start of the less safe improved trajectory to the current position of the aircraft based on respective discrepancies, in parameter values including position, heading and speed, between the start of the less safe improved trajectory and the current position of the aircraft, through comparison with a respective threshold.

According to another aspect of the invention, an aircraft equipped with a flight management system such as described above is also provided. According to another aspect of the invention, a flight management method for managing flight of an aircraft is also provided, this method comprising steps of:

calculating a safe trajectory with a critical first avionics module for trajectory calculation, i.e. a module the integrity level and availability level of which are specified by regulatory standards in force;

calculating a less safe improved trajectory with a second module for trajectory calculation that is less critical than the critical first module, i.e. a module the integrity level and availability level of which are lower than those of the first module;

validating or invalidating the safety of the less safe improved trajectory; and selecting a trajectory from the safe trajectory delivered by the critical first avionics module and the less safe trajectory delivered by the second module, so as to select the less safe improved trajectory if its safety is validated by the critical verification avionics module, to select the safe trajectory if the safety of the less safe improved trajectory is invalidated by the critical verification avionics module, and to deliver as output the selected trajectory, the step of validating or invalidating the safety of the less safe improved trajectory being performed based on verifications:

of compliance with the flight plan of the aircraft by the less safe improved trajectory; and/or of the continuity of the less safe improved trajectory; and/or of compliance of the performance of the aircraft with the less safe improved trajectory; and/or of avoidance of obstacles by the less safe improved trajectory; and/or of a proximity of the start of the less safe improved trajectory to the current position of the aircraft.

BRIEF DESCRIPTION OF THE DRAWINGS

The invention will be better understood on studying a few embodiments that are described by way of completely non-limiting example and illustrated by the appended drawing, in which: FIG. 1 schematically illustrates a flight management system for an aircraft, according to one aspect of the invention.

FIG. 1 schematically illustrates a system according to one aspect of the invention.

DETAILED DESCRIPTION

The present invention employs the simplex-architecture concept.

In a simplex architecture two modules performing the same function are run in parallel: a simple module characterized by its robustness and its high level of safety and a complex module characterized by its performance (hence the name "simplex", contraction of simple and complex).

The aircraft flight management system 1 comprises:

a critical first avionics module for trajectory calculation 2, i.e. a module the integrity level and availability level of which are specified by regulatory standards in force, comprising at least one critical avionics computer and/or at least one critical avionics software package for calculating and delivering as output a safe trajectory, based on a flight plan 3;

a second module for trajectory calculation 4 that is less critical than the critical first module 2, i.e. a module the integrity level and availability level of which are lower than those of the first module 2, comprising at least one computer that is less critical than a computer of the first module 2, and/or at least one software package that is less critical than a software package of the first module 2, and that have/has a higher performance than the avionics computers and software packages of the critical first avionics module for trajectory calculation 2, to calculate and deliver as output an improved trajectory that is less safe than the trajectory delivered by the critical first avionics module 2, based on a flight plan;

a critical avionics module for trajectory verification 5 configured to validate or invalidate the safety of the improved trajectory delivered by the second module for trajectory calculation 4; and a critical avionics module for decision-making 6 configured to select a trajectory from the safe trajectory delivered by the critical first avionics module 2 and the less safe trajectory delivered by the second module 4, so as to select the less safe improved trajectory if its safety is validated by the critical verification avionics module 5, to select the safe trajectory if the safety of the less safe improved trajectory is invalidated by the critical verification avionics module 5, and to deliver as output the selected trajectory.

The critical first avionics module for trajectory calculation 2 implements the trajectory calculation with the objectives of meeting the constraints of the flight plan and of algorithm simplification. This module does not necessarily return an optimized solution. It must be simple, ensure integrity and remain stable over time.

The second module for trajectory calculation 4 implements an optimized trajectory calculation, with honed use of the capacities of the aircraft and while taking into account every constraint, whether regulatory or not (for example the energy footprint of the flight). The calculation of the fuel required may be more accurate, this for example making it possible to provide accurate information on whether a flight is possible or not. All these calculations may implement complex algorithms. The second module for trajectory calculation 4 is not intended to be safe, this allowing:

algorithms to be used that would be complex to make safe (e.g. artificial-intelligence algorithms), it to be run on powerful computers (optionally datacenters outside the aircraft), and up-to-date and accurate data (e.g. weather predictions and data on air traffic) to be employed.

The second module 4 for calculation of the less safe improved trajectory, which is said to be high performance, is therefore aimed at optimization.

The critical avionics module for decision-making 6 is configured to transmit the selected trajectory to a guidance and display device 7.

The less critical second module for trajectory calculation 4 may comprise at least one remote connected computer, for example one integrated into a ground-based server.

The second module for trajectory calculation 4 may comprise at least one software package employing artificial intelligence.

The critical avionics module for trajectory verification 5 is configured to validate or invalidate the safety of the less safe improved trajectory based on verifications:

of compliance with the flight plan of the aircraft by the less safe improved trajectory; and/or of the continuity of the less safe improved trajectory; and/or of compliance of the performance of the aircraft with the less safe improved trajectory; and/or of avoidance of obstacles by the less safe improved trajectory; and/or of a proximity of the start of the less safe improved trajectory to the current position of the aircraft.

The critical avionics module for trajectory verification 5 is configured to verify the proximity of the start of the less safe improved trajectory to the current position of the aircraft based on respective discrepancies, in parameter values including position, heading and speed, between the start of the less safe improved trajectory and the current position of the aircraft, through comparison with a respective threshold.

The critical avionics module for trajectory verification 5 is a strategic component of this architecture. It validates or invalidates the less critical calculations, making it possible for the critical-avionics world to use the trajectory. Several verifications are performed on the trajectory:

compliance with the flight plan: the trajectory must respect the steps defined in the flight plan (legs and constraints). Since the flight plan represents the contract with ATM, it is important for the trajectory to remain within the envelope of the corridor defined by the flight plan through respect, in each section, of the required navigation performance (RNP); and/or continuity: the trajectory must be defined at every point and the segments that define it must be contiguous; and/or compliance of the performance of the aircraft: the trajectory must be able to be flown by the airplane given its performance. This includes, but is not limited to, cornering radii and climb rates and speeds; and/or avoidance of obstacles: the trajectory must not conflict with terrain and/or elements of the physical environment; and/or proximity of the start of the less safe improved trajectory to the current position of the aircraft.

The critical avionics module for decision-making 6 is configured to select a trajectory from the safe trajectory and the less safe improved trajectory, so as to select the less safe improved trajectory if its safety is validated by the critical verification avionics module 5, to select the safe trajectory if the safety of the less safe improved trajectory is invalidated by the critical verification avionics module 5, and to deliver as output the selected trajectory.

An aircraft may be equipped with a flight management system such as described.

A flight management method for managing flight of an aircraft is also provided, this method comprising steps of:

calculating a safe trajectory with a critical first avionics module for trajectory calculation 2, i.e. a module the integrity level and availability level of which are specified by regulatory standards in force;

calculating a less safe improved trajectory with a second module for trajectory calculation 4 that is less critical than the critical first module 2, i.e. a module the integrity level and availability level of which are lower than those of the first module 2;

validating or invalidating the safety of the less safe improved trajectory; and selecting a trajectory from the safe trajectory delivered by the critical first avionics module 2 and the less safe trajectory delivered by the second module 4, so as to select the less safe improved trajectory if its safety is validated by the critical verification avionics module 5, to select the safe trajectory if the safety of the less safe improved trajectory is invalidated by the critical verification avionics module 5, and to deliver as output the selected trajectory.

The present invention has the following advantages:

Reduction in the complexity of the critical avionics software: the critical avionics modules ("high assurance" calculation, trajectory verification and module for decision-making) perform simple calculations, as opposed to the less critical (avionics or non-avionics) modules ("high performance" calculation), which subsume all the algorithmic complexity of optimization. Reduction in the complexity of the critical avionics algorithms reduces the number of requirements, of lines of code, and therefore of tests.

Reduction in hardware requirements: reducing the CPU footprint of the critical avionics algorithms, and therefore of the real-time architecture of the software, reduces the required power of the critical avionics computers, and therefore reduces costs as older and/or less "powerful" hardware may be used. For less critical calculations, a standard or COTS computer (COTS standing for Commercial Off The Shelf) may be used, this allowing a better SWaP (Size, Weight and Power).

Readiness for future needs: development of flight management systems will mainly focus on improving trajectory optimization, and taking into account an increasingly large number of constraints. Shifting these loads to the open world will allow much easier development, and will allow future needs to be rapidly met.

Compatibility with new technologies: the "high performance" chain of the simplex architecture makes it possible to use techniques that are very difficult to certify, such as artificial intelligence.

Stability of the avionics module: functional variability may be shifted to the critical "high performance" avionics chain. The critical avionics algorithms of the "high assurance" chain are not impacted by new needs.

The invention claimed is:

1. A flight management system for an aircraft, comprising:
   a critical first avionics module for trajectory calculation, i.e. a module the integrity level and availability level of which are specified by regulatory standards in force, comprising at least one critical avionics computer and/or at least one critical avionics software package for calculating and delivering as output a safe trajectory, based on a flight plan;
   a second module for trajectory calculation that is less critical than the critical first module, i.e. a module the integrity level and availability level of which are lower than those of the first module, comprising at least one computer that is less critical than a computer of the first module, and/or at least one software package that is less critical than a software package of the first module, and that have/has a higher performance than the avionics computers and software packages of the critical first avionics module for trajectory calculation, to calculate and deliver as output an improved trajectory that is less safe than the trajectory delivered by the critical first avionics module, based on a flight plan;
   a critical avionics module for trajectory verification configured to validate or invalidate the safety of the less safe improved trajectory delivered by the second module; and
   a critical avionics module for decision-making configured to select a trajectory from the safe trajectory delivered by the critical first avionics module and the less safe trajectory delivered by the second module, so as to select the less safe improved trajectory if its safety is validated by the critical verification avionics module, to select the safe trajectory if the safety of the less safe improved trajectory is invalidated by the critical verification avionics module, and to deliver as output the selected trajectory;
   the critical avionics module for trajectory verification being configured to validate or invalidate the safety of the less safe improved trajectory based on verifications:
   of compliance with the flight plan of the aircraft by the less safe improved trajectory; and/or
   of the continuity of the less safe improved trajectory; and/or
   of compliance of the performance of the aircraft with the less safe improved trajectory; and/or
   of avoidance of obstacles by the less safe improved trajectory; and/or
   of a proximity of the start of the less safe improved trajectory to the current position of the aircraft.

2. The system as claimed in claim 1, wherein the critical avionics module for decision-making is configured to transmit the selected trajectory to a guidance and display device.

3. The system as claimed in claim 1, wherein the second module for trajectory calculation comprises at least one remote connected computer, for example one integrated into a ground-based server.

4. The system as claimed in claim 1, wherein the second module for trajectory calculation comprises at least one software package employing artificial intelligence.

5. The system as claimed in claim 1, wherein the critical avionics module for trajectory verification is configured to verify the proximity of the start of the less safe improved trajectory to the current position of the aircraft based on respective discrepancies, in parameter values including position, heading and speed, between the start of the less safe improved trajectory and the current position of the aircraft, through comparison with a respective threshold.

6. An aircraft equipped with a flight management system as claimed in claim 1.

7. A flight management method for managing flight of an aircraft, comprising steps of:
   calculating a safe trajectory with a critical first avionics module for trajectory calculation, i.e. a module the integrity level and availability level of which are specified by regulatory standards in force;
   calculating a less safe improved trajectory with a second module for trajectory calculation that is less critical than the critical first module, i.e. a module the integrity level and availability level of which are lower than those of the first module;
   validating or invalidating the safety of the less safe improved trajectory; and
   selecting a trajectory from the safe trajectory delivered by the critical first avionics module and the less safe trajectory delivered by the second module, so as to select the less safe improved trajectory if its safety is validated by the critical verification avionics module, to select the safe trajectory if the safety of the less safe improved trajectory is invalidated by the critical verification avionics module, and to deliver as output the selected trajectory;
   the step of validating or invalidating the safety of the less safe improved trajectory being performed based on verifications:
   of compliance with the flight plan of the aircraft by the less safe improved trajectory; and/or
   of the continuity of the less safe improved trajectory; and/or
   of compliance of the performance of the aircraft with the less safe improved trajectory; and/or
   of avoidance of obstacles by the less safe improved trajectory; and/or
   of a proximity of the start of the less safe improved trajectory to the current position of the aircraft.

* * * * *